Sept. 2, 1969    H. STAN ETAL    3,464,702
GAME APPARATUS FOR SIMULATING AN AUTOMOBILE TRIP AND
COMPRISING A COIN ACTUATED SIMULATED PARKING METER
Filed March 15, 1967
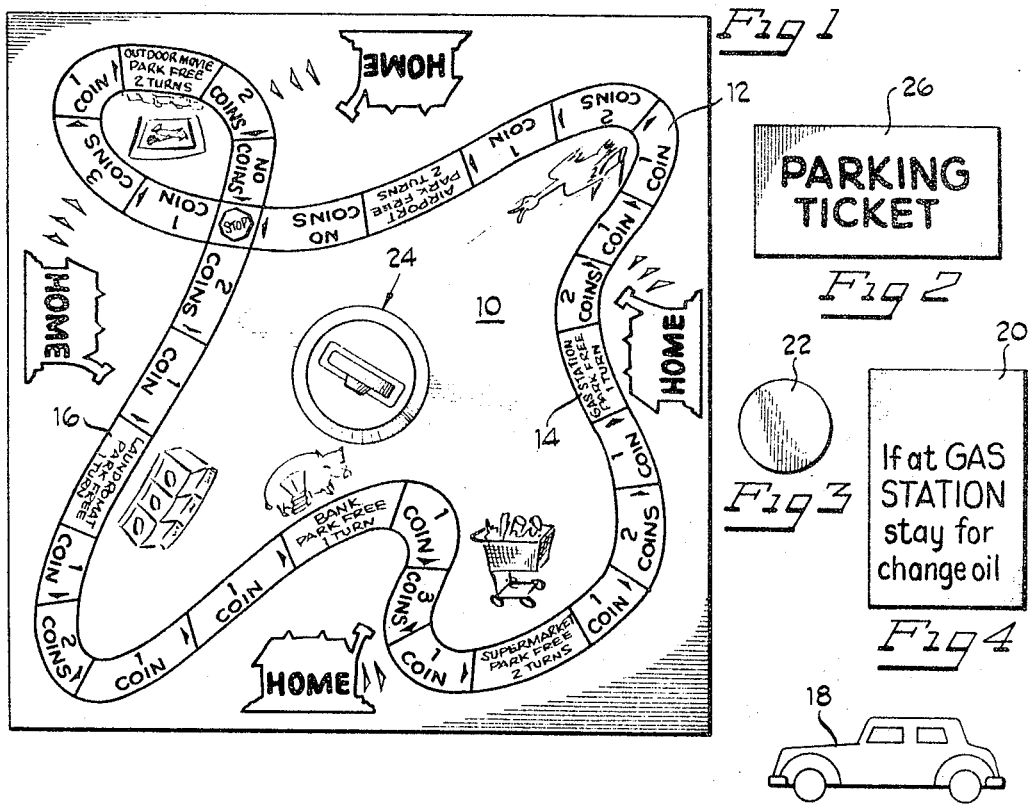
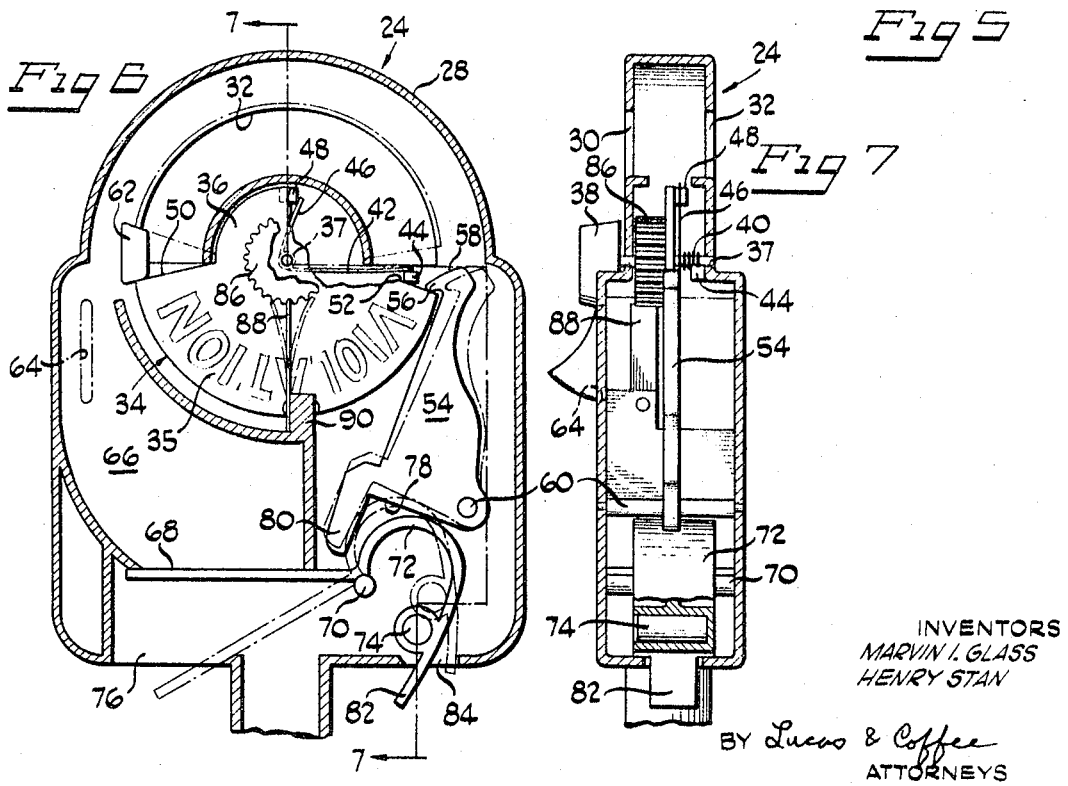
INVENTORS
MARVIN I. GLASS
HENRY STAN
BY Lucas & Coffee
ATTORNEYS

United States Patent Office 3,464,702
Patented Sept. 2, 1969

3,464,702
GAME APPARATUS FOR SIMULATING AN AUTOMOBILE TRIP AND COMPRISING A COIN ACTUATED SIMULATED PARKING METER
Henry Stan and Marvin I. Glass, Chicago, Ill., assignors to Marvin Glass & Associates, Chicago, Ill., a partnership
Filed Mar. 15, 1967, Ser. No. 623,378
Int. Cl. A63f 3/04
U.S. Cl. 273—134       1 Claim

ABSTRACT OF THE DISCLOSURE

A game apparatus having a playing board on which the players move their playing pieces various distances on a path simulating an auto trip, according to the indications on cards held in their hands. There are several free parking spaces on said path, but the other spaces require the deposit of simulated coins in a simulated parking meter. Accumulation of simulated coins having a predetermined total weight in the meter will cause it to trip, actuating a means indicating a violation.

Background of the invention

The invention relates to games of chance and skill, of the type wherein the players race around a board in accordance with the indication on cards, but with some exercise of judgment as to what cards to honor from time to time, and in which a chance mechanism may alter the results which otherwise would flow from the judgment. Games of this type are well known and many different chance mechanisms have been devised for use in connection with them, common examples being dice, colored balls, cards with various legends, spinning indexes and the like, and the present invention particularly concerns itself with game apparatus including a chance device simulating a parking meter, which upon the accumulation of a predetermined weight of simulated coins will trip and indicate a penalty to the player.

Summary of the invention

Game apparatus comprising a housing including an opening therein for the insertion of coins, pivoted means in the housing for supporting the coins and movable to discharge the coins when a predetermined weight of coins is received in the housing, a movable indicating means in the housing, and latch means associated with the pivoted means and the indicating means so as to actuate the latter in response to a coin discharging movement of the pivoted coin supporting means.

Brief description of the drawing

FIGURE 1 is a plan view of the game as set up ready to play;
FIGURE 2 is an enlarged plan view of a parking ticket;
FIGURE 3 is an enlarged plan view of a simulated coin;
FIGURE 4 is an enlarged plan view of a deck of cards;
FIGURE 5 is an enlarged plan view of a playing piece;
FIGURE 6 is an enlarged sectional view of a simulated parking meter; and FIGURE 7 is a sectional view of the same taken on the line 7—7 of FIGURE 6.

The game incorporating the invention includes a board 10, having a path 12 laid out thereon representing a typical auto trip and divided into spaces denoting common distances such as one mile increments. Some of the spaces, as indicated at 14 and 16, have legends indicating that free parking is allowed for a special purpose, for example to get gasoline or to visit a Laundromat. A playing piece in the form of a representation of a car is provided for each player, and they are distinctively colored to enable each player to recognize his own. A deck of cards 20 is furnished, each card giving directions for a move on the part of the player. The cards may be dealt in small quantities to the players, who may then select which set of directions will suit their purpose best, show the appropriate card, place it on a discard pile and make the move, also taking another card from the remainder of the deck.

Each player is also furnished with a supply of metal simulated coins 22, and most of the spaces on path 12 bear legends requiring one or more coins to be inserted in a parking meter 24, preferably located in the center of the board 10, when a player's car stops on such space. Meter 24 trips upon the accumulation of a predetermined weight of coins and indicates a violation, whereupon the player whose coin caused such tripping is required to take a parking ticket from a pack 26, which ticket counts against his score.

Meter 24 comprises an outer shell or body 28, best seen in FIGURES 6 and 7, having the usual semi-circular upper portion provided with openings or windows 30 and 32 through which is visible in one position thereof a rotatable dial 34 bearing the word "Violation." Dial 34 has a large segment 35 and a segment 36 of smaller radius and is fixed on a shaft 37 journaled in the walls of shell 28. A knob 38 is fixed on shaft 37 outside of shell 28 for turning of shaft 37 to rotate dial segment 35 to position beneath windows 30 and 32 so that it will not be visible therethrough. A spring 40 is coiled about shaft 37 and has an anchoring end 42 extending to the right in FIGURE 6 and resting on a lug 44 fixed in shell 28.

Spring 40 also has a driving end 46 which is urged by the stress in the spring against a lug 48 fixed on the back side of dial segment 36 as seen in FIGURE 6. Spring 40 is stressed to tend at all times to rotate dial 34 in a counterclockwise direction as seen in FIGURE 6.

Dial segments 35 and 36, as stated, are of different diameters and separated by substantially radial edges 50 and 52, and a latch lever 54 has a lip 56 for engaging edge 52 to retain dial 34 against rotation. Lip 56 also has an upper inclined cam surface 58 for a purpose to appear. Lever 54 is of considerable mass and pivoted on a pin 60 journaled in shell 28 in such a position relative to the center of gravity of lever 54 that the lever will tend by its own weight to swing in a counterclockwise direction and engage lip 56 with edge 52 whenever the latter is properly positioned. A stop lug 62 fixed within shell 28 is positioned to engage edge 50 and arrest rotation of dial 34 when the latter is turned clockwise by manipulation of knob 38 sufficiently for the word "Violation" to be hidden below windows 30 and 32, at which time lip 56 will engage end 52 and latch dial 34 in this position. Such rotation of knob 38 will rotate shaft 37 and dial 34 and, through the resulting movement of lug 48, wind, or increase the tension in spring 40. It will now be apparent that dial 34, in the event that latch lip 56 is removed from engagement with edge 52, will rotate counterclockwise, as seen in FIGURE 6, under the urging of spring 40, until edge 52 comes to rest against the upper face of stop lug 62. The latter is so located that the large segment of the dial and the word "Violation" will then be substantially centered in the windows 30 and 32. Latch lip 56 is so removed at random and unexpected times by automatic means provided in the simulated parking meter.

More particularly, shell 28 provides a slot 64 spaced laterally from dial 34 and leading into a chamber 66 for the accumulation of a quantity of simulated coins inserted through the slot in the manner of coins placed in a parking meter. Chamber 66 has a movable floor 68 supported in shell 28 on a pivot 70 carried by the latter and has an upwardly arched camming portion 72 beyond pivot 70. Portion 72 is extended downwardly and carries a counterbalance weight 74 of sufficient mass to yieldingly maintain floor 68 in place, but insufficient to maintain it against any substantial accumulation of coins thereon. When sufficient weight has accumulated on floor 68, weight 74 is overcome and floor 68 swings downwardly about pivot 70 and spills the coins out through an opening 76. Such movement raises arched cam portion 72 against a lower surface 78 on lever 54 at a position removed from pin 60, so as to swing the lever clockwise as seen in FIGURE 6 and thereby remove lip 56 from engagement with edge 52 of dial segment 35.

It will be noted in the disclosed embodiment that cam portion 72 contacts surface 78 relatively near to pivot pin 60, but that as the opening movement progresses the point of contact between the two parts shifts farther and farther away from pin 60, so that when enough weight has been accumulated to cause even slight movement of floor 68 the movement will continue and be complete so that the floor will swing all the way to the position shown in broken lines in FIGURE 6 and the coins will be emptied from chamber 66. Lever 54 also has a downwardly directed portion 80 which contacts cam portion 72 to limit the counterclockwise movement of lever 54 when the larger segment 35 has moved up into range of windows 30 and 32 and is no longer present for limiting the inward movement of lip 56 and lever 54. Thereafter, upon clockwise rotation of dial 34, from the broken line position of FIGURE 6, edge 50 will contact cam surface 58 which is inclined sufficiently so that the lever will be pressed to the right for lip 56 to ride on the periphery of segment 35 until edge 52 passes lip 56, whereupon gravity will swing lever 54 counterclockwise and again engage lip 56 with edge 52.

Weight 74 may be sufficient to return floor 68 to its upper position, once it is relieved of the weight of coins accumulated thereon, and this action is assisted by contact of portion 80 of lever 54 with cam portion 72 by reason of the natural tendency of lever 54 to swing counterclockwise. Furthermore, cam portion 72 continues downwardly beyond counterbalance weight 74 and terminates in a tail portion 82 which projects to the outside of shell 28 through an opening 84 so that the movement can be accomplished manually, if necessary.

A toothed wheel 86 is fixed in relation to dial 34 so as to rotate with it and shaft 37, and a light reed-like leaf spring 88 is fixed by any suitable fastening means to a lug 90 within shell 28 and extended into the path of the teeth on wheel 86. Thus the rotation of dial 34 is retarded somewhat, and a sound characteristic of a parking meter is produced whenever the dial rotates.

The operation of the device should be apparent from the above. In playing the game each player receives a car and a supply of coins and is dealt a few cards from the deck. He chooses a card which he thinks will take him to an advantageous position on the path, shows it to the other players, turns it in to a discard pile, and moves his car the number of spaces indicated. The space where he stops will indicate the number of coins he must put in the meter, if any, and he will insert this number. If the weight thereof is insufficient to trip lever 54 he does nothing further until his next turn, except to take a card from the remainder of the deck. The next player follows the same procedure, and so on until the coin or coins of one of the players overcomes counterbalance weight 74, whereupon floor 68 will yield downwardly, spilling the accumulation of coins out through opening 76. At the same time cam portion 72 will press against surface 78, tilting lever 54 toward the right in FIGURE 6 and releasing edge 52 of segment 35, so that spring 40 may rotate dial 34 into the position wherein the word "Violation" shows in windows 30 and 32. At this point, edge 52 will have rotated into contact with stop lug 62 and floor 68, relieved of the weight of coins, will swing back into closed position under the influence of weight 74.

Too rapid rotation of dial 34 will be prevented by reedspring 88 in contact with wheel 86, and a realistic sound will be emitted during the movement. At the same time, cam surface 58 will move into position to be contacted by edge 50 at the time dial 34 is reset, lever 54 being prevented from swinging too far toward the left by contact of portion 80 with a part of cam portion 72.

The player then takes a parking ticket from the pack 26, and resets the meter by turning knob 38, whereupon edge portion 50, contacting cam surface 58, swings lip 56 toward toward the right to ride on segment 35 and engage with edge 52 to maintain dial 34 in the hidden position beneath the windows 30 and 32 until again tripped by an accumulation of coins. Lever 54 adds its weight to cam portion 72 to assist in resisting the weight of coins until a sufficient quantity has been collected. Further random effect is given to the operation of the parking meter by providing coins 22 of various thicknesses. Consequently, whereas three of thicker coins may trip lever 68, for example, various combinations of thick and/or thin coins may include six or seven coins.

The game may be played under varying rules, but essentially the acquisition of a predetermined number of parking tickets puts a player out of the game, and the last player to be still on path 12 wins.

It will be apparent that a game has been provided in which chance figures to a large extent, since it is uncertain just which coins will trip meter 24. Also a certain amount of skill can be exercised in determining which cards to play from time to time to minimize the chance of getting a parking ticket.

What is claimed is:

1. Game apparatus comprising a game board including means defining a path of movement for playing pieces including a series of defined spaces, some of said spaces bearing legends designating different numbers of coins, a plurality of playing pieces simulating automobiles, a plurality of cards to be used by the players and bearing indicia for directing the movement of said playing pieces different numbers of spaces around the path on the game board, a toy parking meter comprising a housing including aligned openings through opposite side walls thereof, means defining a slot in one of the side walls adapted to receive a simulated coin, a pivotally mounted member within said housing including a part on one side of its pivot axis in position to receive and support coins inserted through said slot and a counterweight on the other side of said pivot axis sufficient to normally maintain said part in its coin supporting position, a plurality of simulated coins of various weights such that combinations of such coins are effective to overcome said counterweight and cause downward movement of said part, a discharge opening in said housing underlying said part, indicating means supported in said housing for movement between an exposed position intermediate said aligned openings and a concealed position, means tending to move said indicating means to its exposed position, and latch means pivotally mounted in said housing between said indicating means and said member and operable to maintain said indicating means in its concealed position when said member is positioned to support coins and being further operable in response to movement of said coin supporting part to discharge coins so as to release said indicating means and permit it to move to its exposed position.

References Cited

UNITED STATES PATENTS

| | | | |
|---|---|---|---|
| 495,285 | 4/1893 | Williams | 273—138 |
| 2,458,966 | 1/1949 | Waldrop | 273—134 |
| 2,779,128 | 1/1957 | West | 46—2 |
| 2,804,718 | 9/1957 | Follis et al. | 46—3 |
| 3,367,662 | 2/1968 | Charles et al. | 273—134 |

DELBERT B. LOWE, Primary Examiner

U.S. Cl. X.R.

46—3, 39; 273—138